(12) United States Patent
Luse et al.

(10) Patent No.: US 6,486,660 B1
(45) Date of Patent: Nov. 26, 2002

(54) THERMAL SLIDER LEVEL TRANSFER CURVE TESTER FOR TESTING RECORDING HEADS

(75) Inventors: Todd A. Luse, Delano, MN (US); James R. Peterson, Eden Prairie, MN (US); Thien T. Tu, Bloomington, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/814,433

(22) Filed: Mar. 21, 2001

Related U.S. Application Data

(60) Provisional application No. 60/218,275, filed on Jul. 13, 2000.

(51) Int. Cl.[7] ............................ G01R 33/12; G01K 7/38
(52) U.S. Cl. ........................................ 324/210; 324/224
(58) Field of Search ............................. 324/210, 224, 324/235, 212; 360/323, 324.1

(56) References Cited

U.S. PATENT DOCUMENTS

| | | | | |
|---|---|---|---|---|
| 4,899,051 A | * | 2/1990 | Helm | 250/340 |
| 5,015,950 A | * | 5/1991 | Rose et al. | 324/224 |
| 5,440,233 A | * | 8/1995 | Hodgson et al. | 324/252 |
| 5,517,111 A | | 5/1996 | Shelor | 324/235 |
| 5,696,445 A | | 12/1997 | Inbar | 324/228 |
| 6,194,896 B1 | * | 2/2001 | Takahashi et al. | 324/252 |
| 6,317,280 B1 | * | 11/2001 | Nakajima et al. | 360/59 |

* cited by examiner

*Primary Examiner*—Edward Lefkowitz
*Assistant Examiner*—Darrell Kinder
(74) *Attorney, Agent, or Firm*—Westman, Champlin & Kelly

(57) ABSTRACT

A head testing apparatus is provided for testing a data recording head. The apparatus includes a test volume, a magnetic field source, a holder and a thermoelectric source. The test volume is adapted to receive the head, and the magnetic field source is positioned to generate a magnetic field within the test volume. The holder is adapted to hold the head and position the head within the test volume. The thermoelectric source is positioned to contact the head when the head is positioned within the test volume by the holder.

26 Claims, 6 Drawing Sheets

THERMAL SLIDER LEVEL TRANSFER CURVE TESTER FOR TESTING RECORDING HEADS

CROSS-REFERENCE TO RELATED APPLICATION

This application claims priority from U.S. Provisional Application No. 60/1218,275, filed Jul. 13, 2000, and entitled "THERMAL SLIDER LEVEL TRANSFER CURVE TESTER."

FIELD OF THE INVENTION

The present invention relates to data storage systems and, more particularly, to a transfer curve tester for testing magnetic recording heads used in data storage systems.

BACKGROUND OF THE INVENTION

Many data storage systems use magnetic or magneo-optical recording heads for writing information to and reading information from a magnetic: medium. For example, disc drives of the "Winchester" type have one or more rigid discs, which are coated with a magnetizable medium for storing digital. information in a plurality of circular, concentric data tracks. The discs are mounted on a spindle motor, which causes the discs to spin and the surfaces of the discs to pass under respective head suspension assemblies. Head suspension assemblies carry transducers which write information to and read information from the disc surface. An actuator mechanism moves the head suspension assemblies from track-to-track across the surfaces of the discs under control of electronic circuitry. "Floppy-type" disc drives use flexible discs, which also have circular, concentric data tracks. For a tape drive, the information is stored along linear tracks on the tape surface.

In these applications, several different types of transducers have been used that rely on magnetic properties for writing to and/or reading from the magnetic medium. For an inductive-type transducer, the direction of current through the transducer is controlled during a write operation to encode magnetic flux reversals on the surface of the medium within the selected data track. When retrieving data from the medium, the inductive transducer is positioned over the data track to sense the flux reversals stored in the data track and generate a read signal based on those flux reversals. In a magnetoresistive type of transducing head, the flux reversals cause a change in the resistance of the head, which is sensed by a detector circuit. Typically, a reference current is passed through the magneto-resistive head and the change in resistance is sensed by measuring changes in the voltage across the head. Other types of detecting circuits can also be used.

In order to understand the basic physics of a magnetic transducing head during development and manufacturing, it is common to test the response of the head to an applied magnetic field. For example, one series of tests is known as "Transfer Curve Testing". To generate a transfer curve for a particular transducing head, the head is placed in a magnetic field (steady state or time varying) and the output signal from the transducing head is measured. The transfer curve is simply a plot of the output signal versus the applied magnetic field, where the field is varied from some negative value to some positive value., which is usually the same magnitude as the negative value. For a magneto-resistive type of head, the output signal consists of a steady state voltage. which is a function of the bias current applied to the head, the bulk resistance of the head and the applied magnetic field. Typical characteristics that can be measured from the transfer curve data include read signal amplitude at maximum field, noise with zero field, noise with applied field, linearity over some range of field, and symmetry. Symmetry is a comparison of the read signal amplitude with a maximum positive field and the read signal amplitude with a maximum negative field.

Transfer curve testing can be done at the slider level, the head/gimbal assembly (HGA) level or the drive level. A typical transfer curve tester performed at the slider level operates at ambient temperature. Thus, the head characteristics are not measured over the same temperature range that can occur during normal operation at the drive level. A given head can generate noise or have other functional problems at temperatures that are higher or lower than the ambient temperature at which the head was tested. Such functional problems can interfere with the head's ability to reliably read or write data.

In the past, large environmental chambers have been used during transfer curve testing to cycle the temperature at which the head is operated over a predetermined temperature range. However, this typically involved testing the heads at the HDA level or the drive level, which are significantly downstream along a disc drive's assembly process. If a problem is detected, this limits the available solutions to the problem and increases the cost of the solution. Also, these environmental chambers are fairly large in size, are costly to operate and have relatively slow temperature cycle times.

Thus, a transfer curve tester having an improved structure for cycling the operating temperature of the head being tested is desired.

SUMMARY OF THE INVENTION

One aspect of the present invention is directed to a head testing apparatus for testing a data recording head. The apparatus includes a test volume, a magnetic field source, a holder and a thermoelectric source. The test volume is adapted to receive the head, and the magnetic, field source is positioned to generate a magnetic field within the test volume. The holder is adapted to hold the head and position the head within the test volume. The thermoelectric source is positioned to contact the head when the head is positioned within the test volume by the holder.

Another aspect of the present invention is directed to a data recording head test fixture having a nest for holding a data recording head. A thermoelectric source is positioned relative to the nest such that the thermoelectric source contacts the data recording head when the data recording head is held within the nest.

Another aspect of the present invention is directed to a method of testing a magnetic data recording head. According to the method, the data recording head is positioned relative to a magnetic field. A response of the data recording head to the magnetic field is then measured while a localized temperature change is induced in the data recording head.

Yet another aspect of the present invention is directed to a head testing apparatus, wherein the apparatus includes a magnetic field source and an apparatus for holding a data recording head relative to the magnetic field source and inducing a. localized temperature change in the data recording head.

BRIEF DESCRIPTION OF THE DRAWINGS

FIGS. 9–1 and 9–2 are front and side views, respectively, of a magnetic field source according to an alternative embodiment of the present invention.

DETAILED DESCRIPTION OF ILLUSTRATIVE EMBODIMENTS

Figure 1:
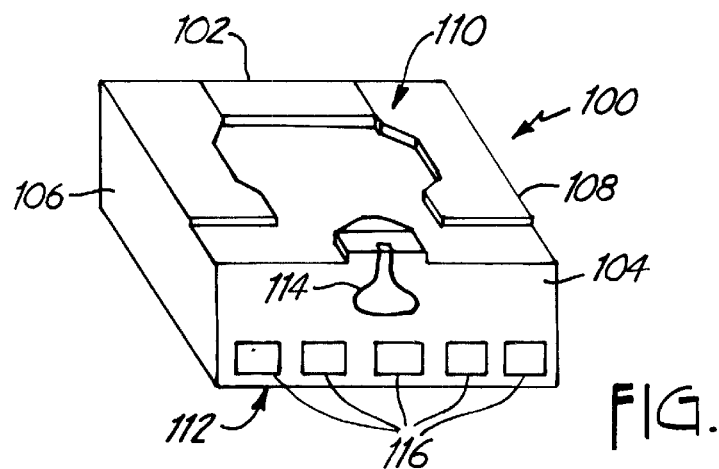
FIG. 1 is a perspective view of a typical disc head slider for a rigid disc drive, as viewed from a bearing surface of the slider.

FIG. 1 is a perspective view of a typical disc head slider for a rigid disc drive, as viewed from a bearing surface of the slider. Slider 100 has a leading edge 102, a trailing edge 104, opposing side walls 106 and 108, a bearing surface 110 and a back surface 112. Slider 100 carries a transducer or "head" 114 for writing to and/or reading from a disc surface in the disc drive. Slider 100 can carry a variety of different types of transducers in alternative embodiments, such at inductive, magneto-resistive, giant magneto-resistive, spin tunnel junction and magneto-optical transducers. These transducers can be placed at a variety of locations on slider 100, but are typically located along trailing edge 104. Electrical contact pads 116 are used to make electrical contact with the transducer elements. During operation, slider 100 is carried by a suspension, which is attached to an actuator mechanism that moves the suspension and the slider 100 from track-to-track across the surface of the disc under control of electronic circuitry.

In order to understand the basic physics of a magnetic recording head during development and manufacturing, it is common to test the electrical and magnetic responses of the head to an applied magnetic field, prior to assembling the head in a drive. For example, one series of tests is known as "Transfer Curve Testing". Another is known as "Scanning Probe Microscopy." To generate a transfer curve for a particular recording head, the head is placed in a magnetic field, and the output signal from the head is measured. The transfer curve is simply a plot of the output signal versus the applied magnetic field, where the field is varied from some negative value to some positive value, which is usually the same magnitude as the negative value. For scanning probe microscopy, a small magnetic field-generating probe is scanned across the head to test the magnetic sensitivity of the head. The output of the head is then plotted as a function of the probe position.

According to one aspect of the present invention, transfer curve testing or scanning probe microscopy is performed while varying the temperature of the head. This allows functional problems of the head that occur at temperatures that are higher or lower than the ambient temperature to be detected at the slider level, before assembly into a head-gimbal assembly (HGA) or into a disc drive. Such functional problems can interfere with the head's ability to reliably read or write data. The temperature is varied locally on the slider body, which allows for a very fast:temperature cycle time and the use of a relatively inexpensive test fixture. A large, expensive temperature chamber as was used in the past at the HGA level and the drive level is not required.

Figure 2:
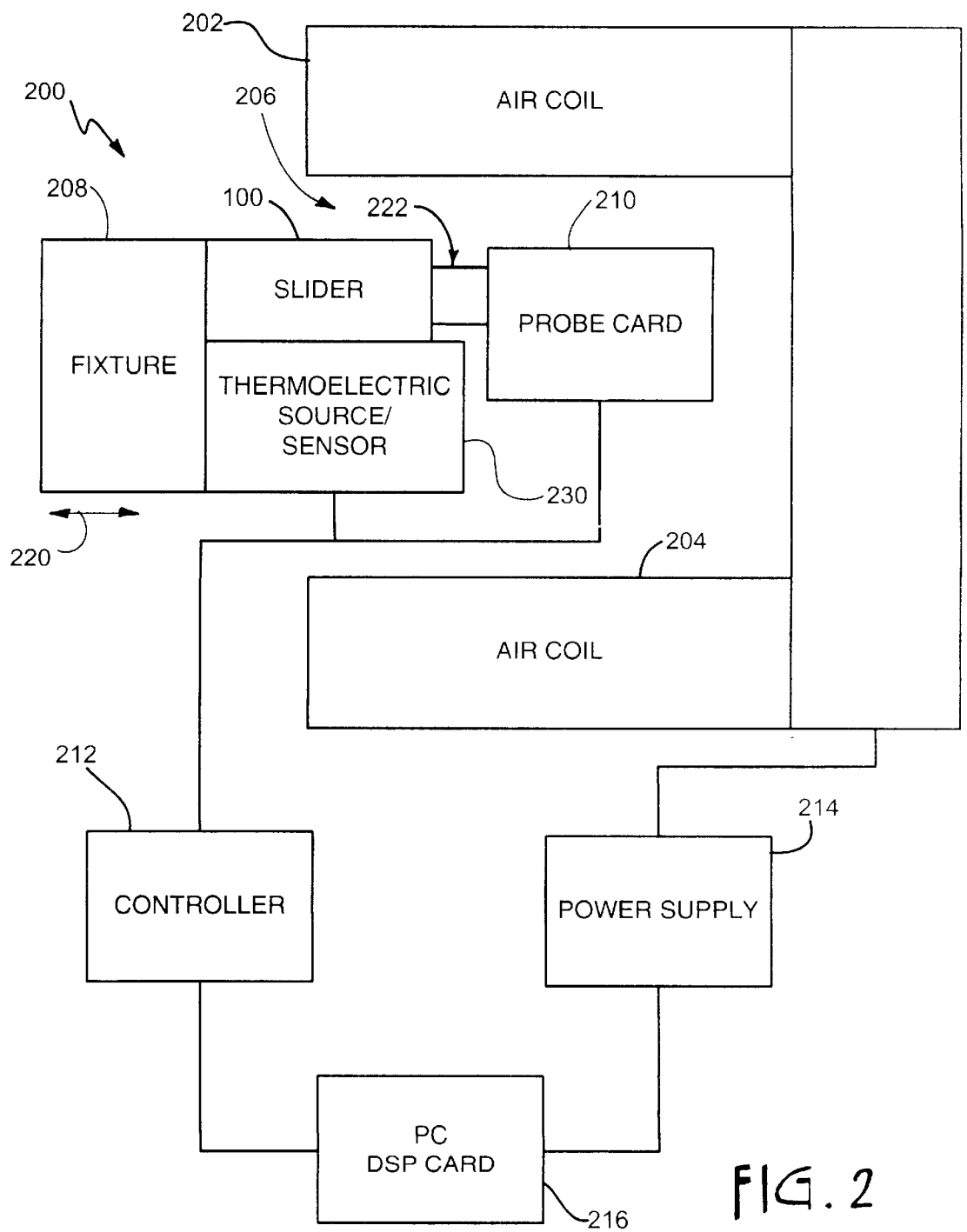
FIG. 2 is a simplified diagram of a recording head tester, according to one embodiment of the present invention.

FIG. 2 is a diagram which schematically illustrates a thermal slider-level transfer curve tester 200 according to one embodiment of the present invention. Tester 200 is capable. of inducing a localized change in the temperature of a magnetic recording head while applying a magnetic field to the head during transfer curve testing. The tester shown in FIG. 2 can be configured for testing recording heads for a hard disc drive, a tape drive, a VCR, or any other type of data storage system. In addition, such "recording" heads can include read-only types of heads or read/write types of heads.

Tester 200 includes magnetic air coils 202 and 204, air gap 206, recording head fixture or "holder" 208, probe card 210, controller 212, power supply 214 and digital signal processing (DSP) card 216. Magnetic air coils 202 and 204 are arranged to generate a magnetic field (simple or complex) across air gap 206 when excited by power supply 214. Air gap 206 forms a test volume for receiving a data recording head under test, such as slider 100.

Although FIG. 2 shows the use of two separated air coils, any suitable apparatus can be used to generate a magnetic field for testing a magnetic head or other magnetically responsive device in accordance with alternative embodiments of the present invention. For example, air coils 202 and 204 can be replaced by four coils for generating two perpendicular magnetic fields across air gap 206 or can be replaced by a movable magnetic probe for scanning probe microscopy.

Fixture 208 is movable along axis 220 and provides a means to firmly retain slider 100 and insert slider 100 into air gap 206. Probe card 210 includes a plurality of probe leads 222 for making electric contact with the electrical contact pads of slider 110, when slider 110 is positioned within air gap 206. In one embodiment, probe card 210 is stationary and positioned relative to coils 202 and 204 such that leads 222 contact the electrical contact pads of slider 110 as fixture 208 moves slider 110 into air gap 206, along axis 220. Leads 222 allow the electrical response of the recording head carried by slider 110 to be measured as the magnetic field generated by coils 202 and 204 is varied. For a magneto-resistive type of head, leads 222 include a first pair of leads for providing a biasing current to the head and a second pair of leads for measuring the resistance of the head. Probe card 210 is electrically coupled to controller 212, which sets the bias current of the head and measures its response to the magnetic field applied by coils 202 and 204. In alternative embodiments, probe card 210 is separately movable relative to fixture 208 or is attached to fixture 208.

In addition, fixture 208 carries a thermoelectric source 230 for inducing a localized temperature change in the data recording head. In one embodiment thermoelectric source 230 makes direct physical contact with slider 100 when slider 100 is retained in fixture 208. Thermoelectric source 230 is operated under the control of controller 212 which, in turn, is controlled by DSP 216. For example, controller 212 can cycle the temperature of the data recording head from a temperature below ambient temperature, such as the dew point, to a temperature above the ambient temperature, such as 100 degrees Celsius, while power supply 214 cycles the magnetic field generated by coils 202 and 204. Any distortions in a plot of the output signal of the head versus the applied magnetic field may indicate a functional problem of the head related to temperature. The overall test procedure and analysis performed by tester 200 is controlled by digital signal processing card 216, which is coupled to controller 212 and power supply 214.

Controller 212 can control thermal electric source 230 with an open-loop or a closed-loop control function. In one embodiment, thermoelectric source 230 further includes a temperature sensor, such as a resistive temperature device (RTD), a thermocouple or a thermister for measuring the temperature of slider 100. The measured temperature is then fed back to controller 212. Since thermoelectric source 230 induces a localized temperature change in slider 100, the temperature of slider 100 can be changed relatively quickly, thus providing a reduction in the total time required to test-each head as compared to the time that would be required if an environmental chamber were used.

In an alternative embodiment, thermal electric source 230 is mounted in tester 200 separately from fixture 208. Thermal electric source 230 can be supported in a fixed position so as to contact slider 100 when slider 100 is positioned within air gap 206 or can be separately movable into contact with the slider.

Figure 3:
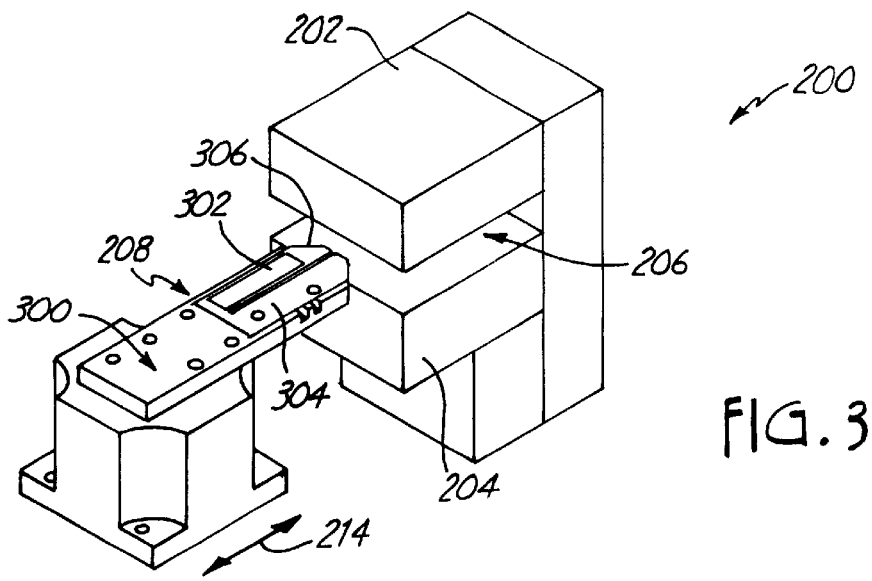
FIG. 3 is a simplified, perspective view of a structural implementation of the tester shown in FIG. 2, according to one embodiment of the present invention.

FIG. 3 is a simplified, perspective view of a structural implementation of tester 200, according to one embodiment of the present invention. Fixture 208 includes a base slide 300 and a nest clamping assembly 302. Base slide 300 is movable relative to coils 202 and 204 along axis 214. Nest clamping assembly 302 is attached to base slide 300 and is adapted to hold slider 100 (shown in FIGS. 1 and 2) for insertion into air gap 206. In one embodiment, nest clamping assembly 302 includes a plate spring 304, which is mounted to base slide 300 and has a spring-loaded cut-out at distal end 306 for receiving slider 100.

Figure 4:
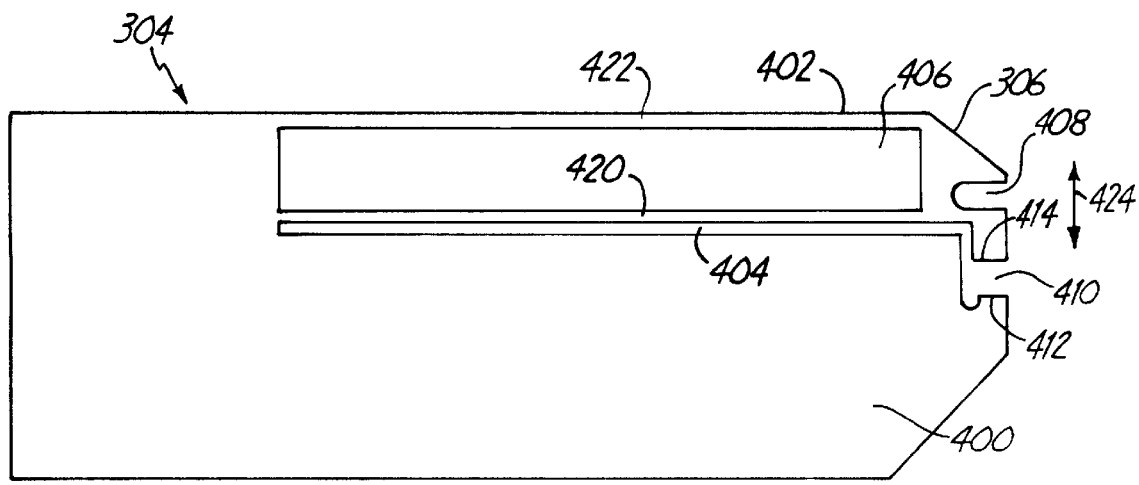
FIG. 4 is a top plan view of a plate spring used in the tester shown in FIGS. 2–3, the according to one embodiment of the present invention.

FIG. 4 is a top plan view of plate spring 304 according to one embodiment of the present invention. Spring 304 includes a main body 400 and a resilient arm 402, which are defined by cut-outs 404, 406 and 408. Cut-out 404 has an area along distal end 306 that defines a nest 410 for holding slider 100. Nest 410 has a first side wall 412 on main body 400 and a second, opposing side wall 414 on the distal end of resilient arm 402 for contacting side surfaces 106 and 108 (shown in FIG. 1) of slider 100. Cut-outs 404 and 406 define a pair of beams 420 and 422 which allow resilient arm 402 and thus side wall 414 to move relative to side wall 412 in-a plane defined by plate spring 304, in the direction of arrow 424.

When slider 100 is to be mounted within plate spring 302, an actuating pin (not shown) is inserted into cut-out 408 and engages the distal, free end 306 of arm 402 to move side wall 414 away from side wall 412. When slider 100 has been placed within nest 410.; the actuating pin releases arm 402 and side walls 412 and 414 engage the opposing side surfaces of slider 100. A variety of other spring shapes, structures and clamping mechanisms can also be used in alternative embodiments for holding slider 100. Plate spring 304 is simply one example of a device that can be used for temporarily holding a slider within the test fixture.

Figure 5:
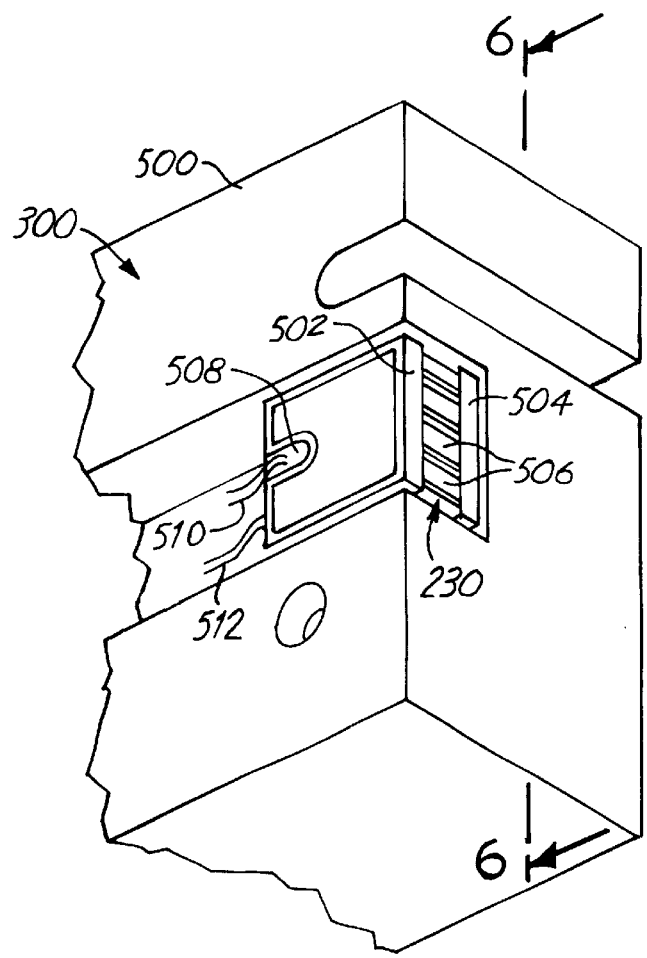
FIG. 5 is a fragmentary, perspective view of the distal end of a base slide used in the tester shown in FIGS. 2–3.

FIG. 5 is a fragmentary, perspective view of the distal end of base slide 300 with plate spring 304 removed. Base slide 300 has a top surface 500, which faces the bottom surface of plate spring 304 (shown in FIGS. 3 and 4). A channel 501 is formed in top surface 500, and thermoelectric source 230 mounted within channel 501. Thermoelectric source 230 has an upper ceramic plate 502 and a lower ceramic plate 504, which are separated by stanchions 506.

Ceramic plate 502 is recessed slightly from top surface 500 of base slide 300. A temperature sensor 508 is attached ceramic plate 502 and has leads 510. Leads 510 are electrically coupled to controller 212 (shown in FIG. 2) and provide an electrical feedback signal indicative of the temperature of the plate. Thermoelectric source 230 also has temperature control leads 512 which are coupled to controller 212 and control the heating and cooling of ceramic plates 502 and 504. Depending on the direction of current (or voltage) applied to temperature control leads 512, one of the plates 502 and 504 acts as a heat source for inducing localized heating and the other of the plates 502 and 504 acts as a heat sink for inducing localized cooling. Thus, by controlling the amplitude and direction of the current (or voltage) applied to temperature control leads 512, the temperatures of plates 502 and 504 (and therefore the slider held by the fixture) can be controlled.

A variety of thermoelectric sources can be used in accordance with the present invention. For example, one suitable thermoelectric source is a "thermoelectric cooler" available from Marlow Industries, Inc. of Dallas, Tex. This thermoelectric cooler is a solid state heat pump that operates on the Peltier effect. The cooler includes an array of P-channel and N-channel semiconductor elements that act as two dissimilar conductors. The array of elements is coupled between ceramic plates 502 and 504 electrically in series with one another and thermally in parallel with one another. Applying a voltage between the two dissimilar conductors creates a temperature difference. Peltier cooling causes heat to move from one plate to the other.

Figure 6:
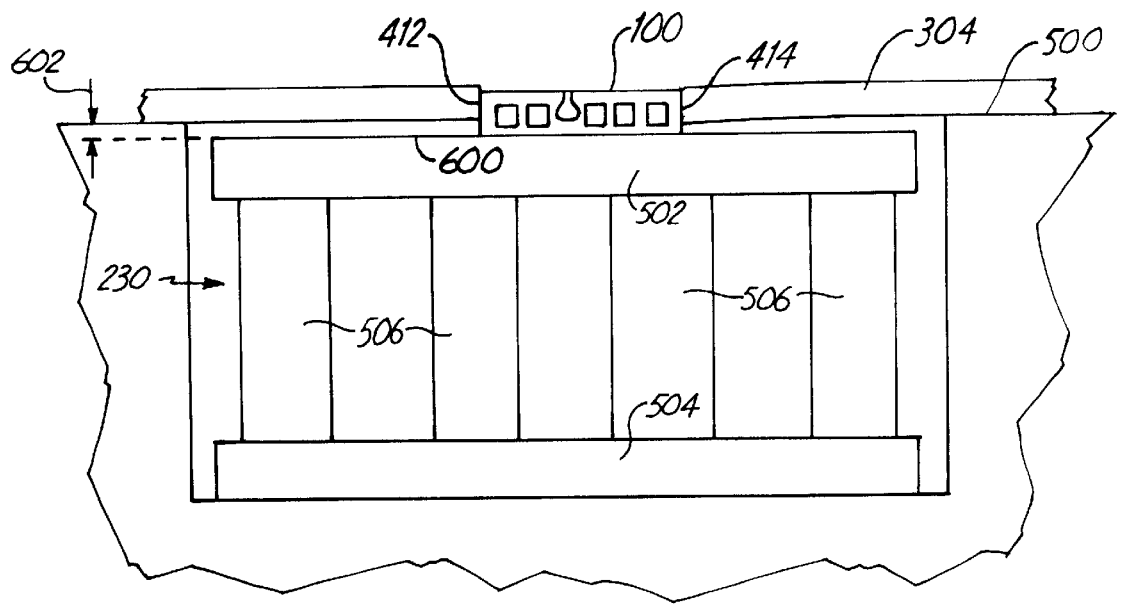
FIG. 6 is a fragmentary, end view of the base slide, as viewed along lines 6—6 of FIG. 5.

FIG. 6 is a fragmentary, end view of base slide 300, as viewed along lines 6—6 of FIG. 5. Plate spring 304 is attached to the top surface 500 of base slide 300, and slider 100 is held between opposing slide walls 412 and 414 of plate spring 304. Plate spring 304 holds slider 100 such that slider 100 contacts the top surface 600 of ceramic plate 502. In one embodiment, top surface 600 is recessed slightly from the top surface 500 of base slide 300 to provide an air gap 602 which acts as a thermal insulator between spring 302 and ceramic plate 502. This prevents spring 304 from taking heat away from slider 100. As such, only slider 100 is in contact with ceramic plate 502. One or both of the side walls 412 and 414 can be bent downward toward top surface 600 so as to apply a force on slider 100 that biases slider 100 into contact with the top surface 600. In the embodiment shown in FIG. 6, side wall 414 is displaced downward relative to side wall 412.

Figure 7:
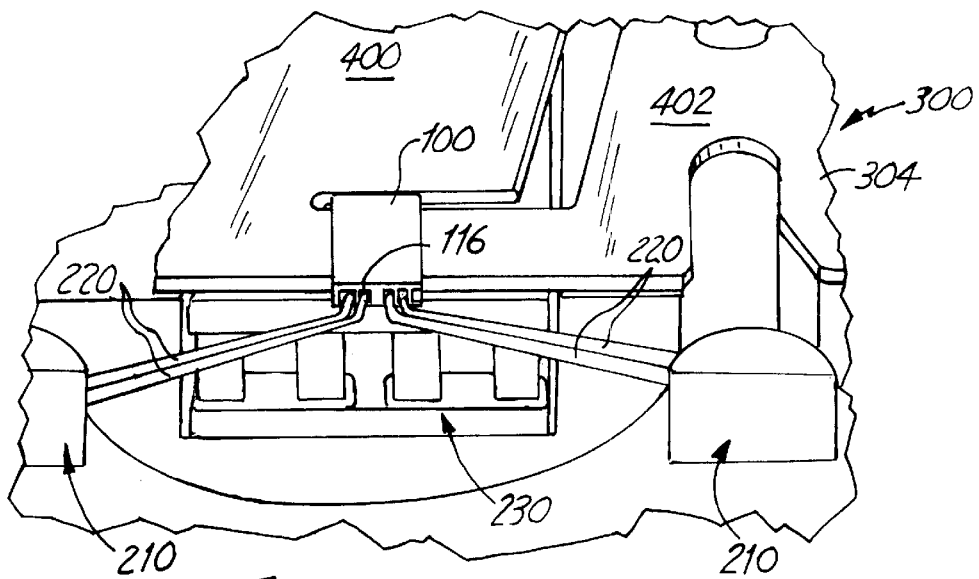
FIG. 7 is a fragmentary, perspective view of the base slide shown in FIGS. 5–6, which illustrates an electrical connection between a probe card and a slider within the tester shown in FIGS. 2–3.

FIG. 7 is a fragmentary, perspective view of base slide 300, which illustrates the electrical connection between probe card 210 and slider 100. When base slide 300 is inserted into air gap 206, as shown in FIG. 2, base slide 300 urges the electrical bond pads at the trailing edge of slider 100 into electrical contact with probe leads 220. This electrical interconnect permits the head resistance to be monitored (during reading and/or writing) while cycling the temperature of the head. In one embodiment, head's resistance is be used to by controller 212 to control the temperature in a closed-loop control function, for example. However, any type of open-loop or closed-loop control function can be used during the test procedure.

Figure 8:
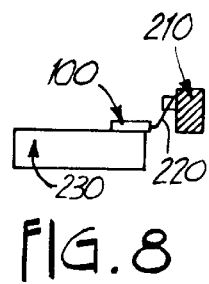
FIG. 8 illustrates the electrical connection between the probe card and the slider, as viewed from one of the side surfaces of the slider.

FIG. 8 illustrates the electrical connection between probe card 210 and slider 100, as viewed from one of the side surfaces of the slider. Slider 100 is held in contact with thermoelectric source 230. When slider 100 is inserted within air gap 206 (shown in FIGS. 2 and 3); probe leads 220 of probe card 210 come in contact with the electrical bond pads of slider 100, as shown in FIG. 7.

The tester shown in the preceding figures provides a means to firmly retain the slider within the tester in a non-destructive manner and provides a robust electrical interconnect between the slider and the measurement electronics. The thermoelectric source allows the temperature of the head to be varied as the head is tested on a slider level. Such thermal testing can assist in pinpointing a functional problem to a thermal event, which may help lead to a timelier solution of the problem. Failure analysis at the slider level is sufficiently upstream in the disc drive assembly process to allow a head to be replaced prior to attachment within a head gimbal assembly and ultimately within a disc drive. Replacement of a faulty head at this stage is significantly less costly than at stages later in the assembly process. Also, the thermoelectric source is smaller, less costly and can cycle temperatures faster than an environmental chamber.

Figures 1, 9:
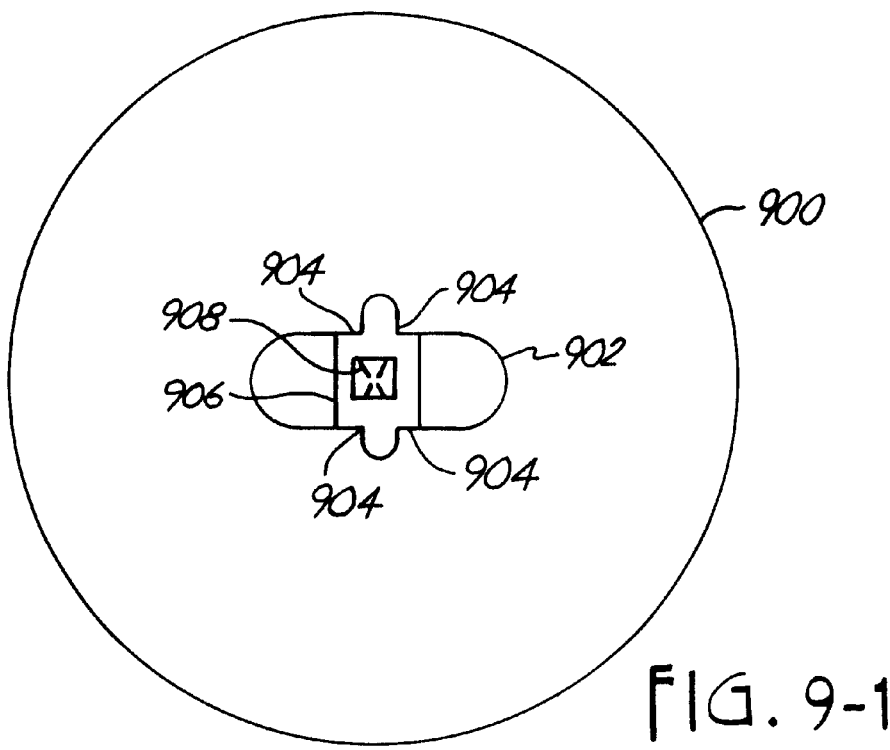
Figures 2, 9:
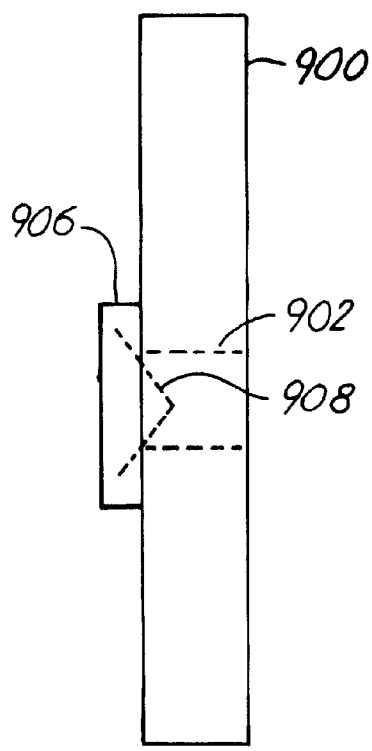

FIGS. 9-1 and 9-2 are front and side views, respectively, of a magnetic field source according to an alternative embodiment of the present invention. Magnetic field source 900 has an air gap 902, which forms a test volume for receiving and testing data recording heads, and has two coils that form four poles 904. With four poles, magnetic fields can be generated across air gap 902 in two orthogonal directions. Probe card 906 is attached to one side of magnetic field source 900 and aligned with air gap 902 such that probe leads 908 electrically connect to the electrical bond pads of the head when the head is inserted within the air gap. Other coil configurations can also be used in alternative embodiments.

Figure 10:
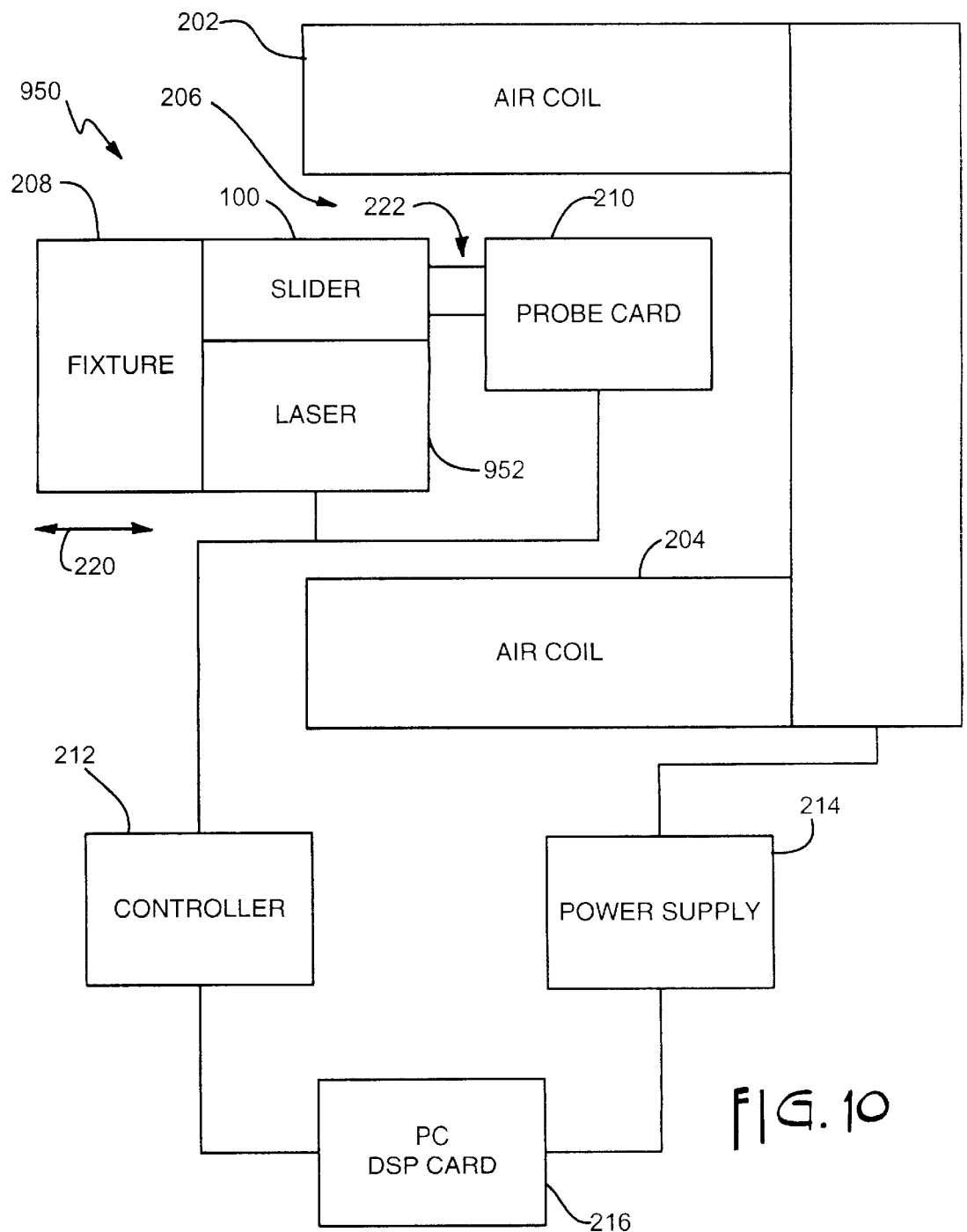
FIG. 10 is a schematic diagram illustrating a head tester according to another alternative embodiment of the present invention.

FIG. 10 is a schematic diagram illustrating a head tester according to another alternative embodiment. of the present invention. The same reference numerals are used in FIG. 10 as were used in FIG. 2 for the same or similar elements. In head tester 950, thermoelectric source 230 is replaced with a laser 952, which directs a laser beam to a surface of slider 100 when slider 100 is inserted into air gap 206. The laser beam induces a localized temperature change in slider 100 that can be used for inducing thermal-related faults in the recording head during transfer curve testing or scanning probe microscopy. Laser 502 can be attached to fixture 208 or can be mounted externally to fixture 208. Laser 502 can be stationary or can be movable with or separately from fixture 208.

In summary, one aspect of the present invention is directed to a head testing apparatus 200 for testing a data recording head 100. The apparatus includes a test volume 206, a magnetic field source 202, 204, 900, a holder 208 and a thermoelectric source 230. The test volume 206 is adapted to receive the head 100, and the magnetic field source 202, 204, 900 is positioned to generate a magnetic field within the test volume 206. The holder 208 is adapted to hold the head 100 and position the head 100 within the test volume 206. The thermoelectric source 230 is positioned to contact the head 100 when the head 100 is positioned within the test volume 206 by the holder 208.

Another aspect of the present invention is directed to a data recording head test fixture 208 having a nest 410 for holding a data recording head 100. A thermoelectric source 230 is positioned relative to the nest 410 such that the thermoelectric source contacts 230 the data recording head 100 when the data recording head 100 is held within the nest 410.

Another aspect of the present invention is directed to a method of testing to a magnetic data recording head 100. According to the method, the data recording head 100 is positioned relative to a magnetic field generated by a magnetic field source 202, 204, 900. A response of the data recording head 100 to the magnetic field is then measured while a localized temperature change is induced in the data recording head 100 by a heating or cooling source 230, 952.

Yet another aspect of the present invention is directed to a head testing apparatus 200, 950, wherein the apparatus 200, 950 includes a magnetic field source 202, 204, 900 and an apparatus 208, 230, 952 for holding a data recording head 100 relative to the magnetic field source 202, 204, 900 and inducing a localized temperature change in the data recording head 100.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the head testing apparatus can be used in any application requiring or benefiting from a localized control of the head temperature. These testers can be configured for testing a variety of different types of recording heads.

What is claimed is:

1. A head testing apparatus for testing a data recording head, the apparatus comprising:
    a test volume adapted to receive the data recording head;
    a magnetic field source positioned to generate a magnetic field within the test volume;
    a holder adapted to hold the data recording head temporarily with a releasable connection and position the data recording head within the test volume; and
    a thermoelectric source positioned externally to the data recording head and positioned to contact the data recording head temporarily when the data recording head is positioned within the test volume by the holder.

2. The head testing apparatus of claim 1 wherein:
    the holder comprises a nest for holding the data recording head; and
    the thermoelectric source is mounted on the holder and positioned relative to the nest such that the thermoelectric source contacts the data recording head when the data recording head is held within the nest.

3. The head testing apparatus of claim 2 wherein the holder further comprises:
    a base, wherein the thermoelectric source is positioned relative to a surface of the base; and
    a plate spring mounted generally parallel to the surface of the base and comprising a cut-out portion that forms the nest and is aligned with the thermoelectric source, wherein the cut-out portion has first and second opposing side walls for contacting first and second opposing side surfaces of the data recording head when the data recording head is positioned within the nest.

4. The head testing apparatus of claim 3 wherein:
    the thermoelectric source is recessed into the surface of the base and has a generally planar thermoelectric surface, which is generally parallel to the plate spring, perpendicular to the first and second opposing side walls and faces the cut-out portion for contact with the data recording head.

5. The head testing apparatus of claim 4 wherein the plate spring has a bend that displaces at least one of the first and second opposing side walls of the cutout portion downward toward the thermoelectric surface so as to bias the data recording head into contact with the thermoelectric surface when the data recording head is held within the nest.

6. The head testing apparatus of claim 4 and further comprising a thermal insulating air gap between the thermoelectric surface and a lower surface of the plate spring, which faces the thermoelectric surface.

7. The head testing apparatus of claim 3 wherein the plate spring comprises:
   a main body on which the first side wall of the cut-out portion is located; and
   a resilient arm having a proximal end attached to the main body and a distal, free end which is separated from the main body by the cut-out portion, wherein the second side wall of the cut-out portion is located on the distal, free end of the arm and is movable relative to the first side wall in a plane defined by the plate spring.

8. The head testing apparatus of claim 1 wherein:
   the thermoelectric source comprises first and second current inputs; and
   the thermoelectric source forms a heat source when a first current is applied to the first and second current inputs in a first direction and forms a heat sink when a second current is applied to the first and second current inputs in a second, opposite direction.

9. The head testing apparatus of claim 1 wherein the thermoelectric source comprises a thermoelectric surface, which faces the nest for contacting the data recording head, and a comprises temperature sensor attached to the thermoelectric surface.

10. A data recording head test fixture comprising:
    a nest having a releasable connection for holding a data recording head temporarily; and
    a thermoelectric source positioned relative to the nest such that the thermoelectric source contacts the data recording head when the data recording head is temporarily held within the nest.

11. The data recording head test fixture of claim 10 and further comprising a holder, which comprises:
    a base, wherein the thermoelectric source positioned relative to a surface of the base; and
    a plate spring mounted generally parallel to the surface of the base and comprising a cut-out portion that forms the nest and is positioned over the thermoelectric source, wherein the cut-out portion has first and second opposing side walls for contacting first and second opposing side surfaces of the data recording head when the data recording head is positioned within the nest.

12. The data recording head test fixture of claim 11 wherein:
    the thermoelectric source is recessed into the surface of the base and has a generally planar thermoelectric surface, which is generally parallel to the plate spring, is generally perpendicular to the first and second opposing side walls and faces the cut-out portion for contact with the data recording head.

13. The data recording head test fixture of claim 12 wherein the plate spring has a bend that forces the cut-out portion downward toward the thermoelectric surface so as to bias the data recording head into contact with the thermoelectric surface when the data recording head is held within the nest.

14. The data recording head test fixture of claim 12 and further comprising a thermal insulating air gap between the thermoelectric surface and a lower surface of the plate spring, which faces the thermoelectric surface.

15. The data recording head test fixture of claim 11 wherein the plate spring comprises:
    a main body on which the first side wail of the cut-out portion is located; and
    a resilient arm having a proximal end attached to the main body and a distal, free end which is separated from the main body by the cutout portion, wherein the second side wall of the cut-out portion is located on the distal, free end of the arm and is movable relative to the first side wall in a plane defined by the plate spring.

16. The data recording head test fixture of claim 10 wherein:
    the thermoelectric source comprises first and second current inputs; and
    the thermoelectric source forms a heat source when a first current is applied to the first and second current inputs in a first direction and forms a heat sink when a second current is applied to the first and second current inputs in a second, opposite direction.

17. The data recording head test fixture of claim 10 wherein the thermoelectric source comprises a thermoelectric surface, which faces the nest for contacting the data recording head, and a temperature sensor attached to the thermoelectric surface.

18. A method of testing a magnetic data recording head comprising steps of:
    (a) positioning the data recording head relative to a magnetic field that is generated externally to the data recording head;
    (b) measuring a response of the data recording head to the magnetic field; and
    (c) inducing a localized temperature change in the data recording head by temporarily contacting the data recording head with a thermoelectric source and varying a temperature of the thermoelectric source while measuring the response in step (b).

19. A head testing apparatus for testing a magnetic data recording head, the apparatus comprising:
    a magnetic field source that is external to the data recording head; and
    means for releasably holding the data recording head relative to the magnetic field source, inducing a localized temperature change in the data recording head by temporarily contacting the data recording head with a thermoelectric source, and varying a temperature of the thermoelectric source while measuring a response of the data recording head to the magnetic field.

20. A data recording head test fixture comprising:
    a nest for holding a data recording head; and
    a thermoelectric source positioned relative to the nest such that the thermoelectric source contacts the data recording head when the data recording head is held within the nest, wherein the thermoelectric source comprises first and second current inputs and forms a heat source when a first current is applied to the first and second current inputs in a first direction and forms a heat sink when a second current is applied to the first and second current inputs in a second, opposite direction.

21. The data recording head test fixture of claim 20 wherein the thermoelectric source comprises a thermoelectric surface, which faces the nest for contacting the data recording head, and a temperature sensor attached to the thermoelectric surface.

22. The data recording head test fixture of claim 20 and further comprising a holder, which comprises:
   a base, wherein the thermoelectric source positioned relative to a surface of the base; and
   a plate spring mounted generally parallel to the surface of the base and comprising a cut-out portion that forms the nest and is positioned over the thermoelectric source, wherein the cut-out portion has first and second opposing side walls for contacting first and second opposing side surfaces of the data recording head when the data recording head is positioned within the nest.

23. The data recording head test fixture of claim 22 wherein:
   the thermoelectric source is recessed into the surface of the base and has a generally planar thermoelectric surface, which is generally parallel to the plate spring, is generally perpendicular to the first and second opposing side walls and faces the cut-out portion for contact with the data recording head.

24. The data recording head test fixture of claim 23 wherein the plate spring has a bend that forces the cut-out portion downward toward the thermoelectric surface so as to bias the data recording head into contact with the thermoelectric surface when the data recording head is held within the nest.

25. The data recording head test fixture of claim 23 and further comprising a thermal insulating air gap between the thermoelectric surface and a lower surface of the plate spring, which faces the thermoelectric surface.

26. The data recording head test fixture of claim 22 wherein the plate spring comprises:
   a main body on which the first side wall of the cut-out portion is located; and
   a resilient arm having a proximal end attached to the main body and a distal, free end which is separated from the main body by the cut-out portion, wherein the second side wall of the cut-out portion is located on the distal, free end of the arm and is movable relative to the first side wall in a plane defined by the plate spring.

* * * * *